United States Patent
Ko et al.

(10) Patent No.: US 8,971,426 B2
(45) Date of Patent: Mar. 3, 2015

(54) ADAPTIVE MULTIPLE ANTENNA TRANSMISSION METHOD AND APPARATUS IN ACCORDANCE WITH ANTENNA TRANSMISSION POWER IN A WIRELESS COMMUNICATION SYSTEM

(75) Inventors: Hyun Soo Ko, Anyang-si (KR); Moon Il Lee, Anyang-si (KR); Ja Ho Koo, Anyang-si (KR); Jae Hoon Chung, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 13/322,139

(22) PCT Filed: May 24, 2010

(86) PCT No.: PCT/KR2010/003236
§ 371 (c)(1),
(2), (4) Date: Feb. 7, 2012

(87) PCT Pub. No.: WO2010/134789
PCT Pub. Date: Nov. 25, 2010

(65) Prior Publication Data
US 2012/0128088 A1    May 24, 2012

Related U.S. Application Data

(60) Provisional application No. 61/180,648, filed on May 22, 2009.

(30) Foreign Application Priority Data

May 20, 2010 (KR) .................. 10-2010-0047488

(51) Int. Cl.
H04K 1/10 (2006.01)
H04L 27/28 (2006.01)
(Continued)

(52) U.S. Cl.
CPC ............ H04B 7/0465 (2013.01); H04B 7/0691 (2013.01); H04W 52/42 (2013.01); H04B 7/0417 (2013.01); H04B 7/0639 (2013.01)
USPC ........... 375/260; 370/437; 370/335; 370/343; 375/267; 375/219; 375/296; 375/340

(58) Field of Classification Search
CPC ....... H04L 5/0044; H04L 1/06; H04L 5/0042; H04L 5/006; H04L 1/0026; H04L 1/0687; H04L 1/0693; H04L 27/2601; H04L 5/0007; H04L 5/0039; H04L 5/0053; H04W 52/04; H04W 52/146; H04B 7/0417; H04B 7/0626; H04B 7/0891; H04B 7/0452; H04B 7/068; H04B 7/0697; H04B 7/0404; H04B 7/0608; H04B 7/061; H04B 7/0691; H04B 7/082; H04B 7/0868
USPC ........ 370/200–546; 375/130–377; 455/1–899
See application file for complete search history.

(56) References Cited

U.S. PATENT DOCUMENTS 8,130,847 B2 * 3/2012 Vook et al. .................... 375/260
2004/0132496 A1 * 7/2004 Kim et al. ................... 455/562.1
(Continued)

FOREIGN PATENT DOCUMENTS

WO     2004/077730     9/2004

OTHER PUBLICATIONS

Kyungchul Kim; Jungwoo Lee, "Antenna grouping techniques for MIMO beamforming systems," Signals, Systems and Computers, 2008 42nd Asilomar Conference on , vol., No., pp. 393,397, Oct. 26-29, 2008.*

(Continued)

*Primary Examiner* — Daniel Washburn
*Assistant Examiner* — Amneet Singh
(74) *Attorney, Agent, or Firm* — Lee, Hong, Degerman, Kang & Waimey (57) ABSTRACT

The present invention relates to a wireless communication system, and an adaptive multiple antenna transmission method and apparatus in accordance with antenna transmission power are disclosed. A method of performing multiple antenna transmission from a terminal to a base station according to one embodiment of the present invention may include the steps of: determining a reference value for a transmission power of each of a plurality of transmit antennas of the terminal; grouping the plurality of transmit antennas into a first group of transmit antennas and a second group of transmit antennas in accordance with the determined reference value; and transmitting a signal to the base station through at least one of the first group of the transmit antennas and the second group of transmit antennas.

6 Claims, 8 Drawing Sheets

$$W3\_1 = \begin{bmatrix} 1 & 1 \\ 1 & -1 \\ a & 0 \\ 0 & b \end{bmatrix} \quad W3\_2 = \begin{bmatrix} 1 & -1 \\ 1 & 1 \\ a & 0 \\ 0 & b \end{bmatrix} \quad W3\_3 = \begin{bmatrix} 1 & 1 \\ j & -j \\ a & 0 \\ 0 & b \end{bmatrix}$$

$$W3\_4 = \begin{bmatrix} 1 & -1 \\ j & j \\ a & 0 \\ 0 & b \end{bmatrix} \quad W3\_5 = \begin{bmatrix} 1 & j \\ 1 & -j \\ a & 0 \\ 0 & b \end{bmatrix} \quad W3\_6 = \begin{bmatrix} 1 & j \\ -1 & j \\ a & 0 \\ 0 & b \end{bmatrix}$$

(51) Int. Cl.
*H04B 7/04* (2006.01)
*H04B 7/06* (2006.01)
*H04W 52/42* (2009.01)

(56) References Cited

U.S. PATENT DOCUMENTS

| | | | | |
|---|---|---|---|---|
| 2004/0165676 | A1* | 8/2004 | Krishnan et al. | 375/267 |
| 2005/0101259 | A1* | 5/2005 | Tong et al. | 455/69 |
| 2006/0039494 | A1* | 2/2006 | Kim et al. | 375/267 |
| 2007/0133708 | A1* | 6/2007 | Lee et al. | 375/267 |
| 2007/0173208 | A1* | 7/2007 | Nishio et al. | 455/78 |
| 2007/0217540 | A1* | 9/2007 | Onggosanusi et al. | 375/267 |
| 2007/0274411 | A1* | 11/2007 | Lee et al. | 375/267 |
| 2008/0013610 | A1* | 1/2008 | Varadarajan et al. | 375/221 |
| 2008/0056414 | A1* | 3/2008 | Kim et al. | 375/347 |
| 2008/0063115 | A1* | 3/2008 | Varadarajan et al. | 375/299 |
| 2008/0192849 | A1* | 8/2008 | Kim et al. | 375/260 |
| 2008/0219370 | A1* | 9/2008 | Onggosanusi et al. | 375/260 |
| 2008/0232449 | A1* | 9/2008 | Khan et al. | 375/220 |
| 2008/0247364 | A1* | 10/2008 | Kim et al. | 370/336 |
| 2008/0273612 | A1* | 11/2008 | Khojastepour et al. | 375/260 |
| 2008/0285670 | A1* | 11/2008 | Walton et al. | 375/260 |
| 2008/0292013 | A1* | 11/2008 | Varadarajan et al. | 375/260 |
| 2008/0303699 | A1* | 12/2008 | Zhang et al. | 341/67 |
| 2009/0016312 | A1* | 1/2009 | Tao et al. | 370/344 |
| 2009/0016372 | A1* | 1/2009 | Tao et al. | 370/437 |
| 2009/0017769 | A1* | 1/2009 | Chen et al. | 455/69 |
| 2009/0042511 | A1* | 2/2009 | Malladi | 455/62 |
| 2009/0054093 | A1* | 2/2009 | Kim et al. | 455/500 |
| 2009/0122777 | A1* | 5/2009 | Tao et al. | 370/343 |
| 2009/0154588 | A1* | 6/2009 | Chen et al. | 375/267 |
| 2009/0202016 | A1* | 8/2009 | Seong et al. | 375/267 |
| 2009/0238298 | A1* | 9/2009 | Kim et al. | 375/267 |
| 2009/0262695 | A1* | 10/2009 | Chen et al. | 370/329 |
| 2009/0262856 | A1* | 10/2009 | Onggosanusi et al. | 375/267 |
| 2009/0316675 | A1* | 12/2009 | Malladi et al. | 370/343 |
| 2010/0027496 | A1* | 2/2010 | Higuchi et al. | 370/329 |
| 2010/0027697 | A1* | 2/2010 | Malladi et al. | 375/260 |
| 2010/0091919 | A1* | 4/2010 | Xu et al. | 375/346 |
| 2010/0118855 | A1* | 5/2010 | Malladi | 370/342 |
| 2010/0220801 | A1* | 9/2010 | Lee et al. | 375/267 |
| 2010/0238913 | A1* | 9/2010 | Xia et al. | 370/342 |
| 2010/0279621 | A1* | 11/2010 | Brown et al. | 455/67.11 |
| 2010/0296591 | A1* | 11/2010 | Xu et al. | 375/259 |
| 2011/0044296 | A1* | 2/2011 | Zhang et al. | 370/336 |
| 2011/0110403 | A1* | 5/2011 | Jongren | 375/219 |
| 2011/0205930 | A1* | 8/2011 | Rahman et al. | 370/252 |
| 2012/0002750 | A1* | 1/2012 | Hooli et al. | 375/295 |
| 2012/0127886 | A1* | 5/2012 | Kim et al. | 370/252 |
| 2012/0163496 | A1* | 6/2012 | Wang et al. | 375/295 |
| 2012/0170674 | A1* | 7/2012 | Kim et al. | 375/267 |

OTHER PUBLICATIONS

Il Han Kim; Lee, K.; Joohwan Chun, "A MIMO Antenna Structure that Combines Transmit Beamforming and Spatial Multiplexing," Wireless Communications, IEEE Transactions on , vol. 6, No. 3, pp. 775,779, Mar. 2007.*

R. Heath and A. Paulraj, "Antenna selection for spatial multiplexing systems based on minimum error rate", Proc. of IEEE ICC 01, pp. 2276-2280, 2002.*

Berardinelli, Gilberto; Sorensen, T.B.; Mogensen, P.; Pajukoski, K., "Precoded Multirank Transmission with Linear Receivers for LTE-A Uplink," Vehicular Technology Conference Fall (VTC 2009-Fall), 2009 IEEE 70th , vol., No., pp. 1,5, Sep. 20-23, 2009.*

* cited by examiner

Fig. 1

-PRIOR ART-

Fig. 2

-PRIOR ART-

$$W1 = \begin{bmatrix} a & 0 \\ b & 0 \\ 0 & c \\ 0 & d \end{bmatrix} \qquad W2 = \begin{bmatrix} a & e & 0 \\ b & f & 0 \\ c & 0 & g \\ d & 0 & h \end{bmatrix}$$

$$W3 = \begin{bmatrix} a & d \\ b & e \\ c & 0 \\ 0 & f \end{bmatrix} \qquad W4 = \begin{bmatrix} a & d & g \\ 0 & e & h \\ b & 0 & i \\ c & f & 0 \end{bmatrix}$$

FIG. 8

$$W3\_1 = \begin{bmatrix} 1 & 1 \\ 1 & -1 \\ a & 0 \\ 0 & b \end{bmatrix} \quad W3\_2 = \begin{bmatrix} 1 & -1 \\ 1 & 1 \\ a & 0 \\ 0 & b \end{bmatrix} \quad W3\_3 = \begin{bmatrix} 1 & 1 \\ j & -j \\ a & 0 \\ 0 & b \end{bmatrix}$$

$$W3\_4 = \begin{bmatrix} 1 & -1 \\ j & j \\ a & 0 \\ 0 & b \end{bmatrix} \quad W3\_5 = \begin{bmatrix} 1 & j \\ 1 & -j \\ a & 0 \\ 0 & b \end{bmatrix} \quad W3\_6 = \begin{bmatrix} 1 & j \\ -1 & j \\ a & 0 \\ 0 & b \end{bmatrix}$$

FIG. 9

ADAPTIVE MULTIPLE ANTENNA TRANSMISSION METHOD AND APPARATUS IN ACCORDANCE WITH ANTENNA TRANSMISSION POWER IN A WIRELESS COMMUNICATION SYSTEM

CROSS-REFERENCE TO RELATED APPLICATIONS

This application is a 371 U.S. national stage application of International Application No. PCT/KR2010/003236, filed on May 24, 2010, which claims priority to Korean Application Serial No. 10-2010-0047488, filed on May 20, 2010, and U.S. Provisional Application Ser. No. 61/180,648, filed on May 22, 2009, the contents of which are incorporated by reference herein in their entirety.

TECHNICAL FIELD

The present invention relates to a wireless communication system, and more particularly, to an adaptive multiple antenna transmission method and apparatus in accordance with antenna transmission power in a wireless communication system.

BACKGROUND ART

A Multiple Input Multiple Output (MIMO) scheme refers to a scheme using multiple transmit antennas and multiple reception antennas so as to improve data transmission/reception efficiency, unlike a conventional scheme using one transmit antenna and one reception antenna. That is, the MIMO scheme increases capacity or improves performance by using multiple antennas in a transmitter or a receiver of a wireless communication system. The MIMO scheme is referred to as a multi-antenna scheme.

MIMO technology collects and combines data fragments received via several antennas without using a single antenna path, in order to receive a message. According to the MIMO technology, data transmission rate can be improved in a specific range or a system range can be increased with respect to a specific data transmission rate. That is, the MIMO technology is next-generation mobile communication technology which can be widely used in a User Equipment (UE), a repeater and the like for mobile communication. This technology is attracting considerable attention as technology capable of overcoming a limit in transfer size of mobile communication due to data communication expansion.

Figure 1:
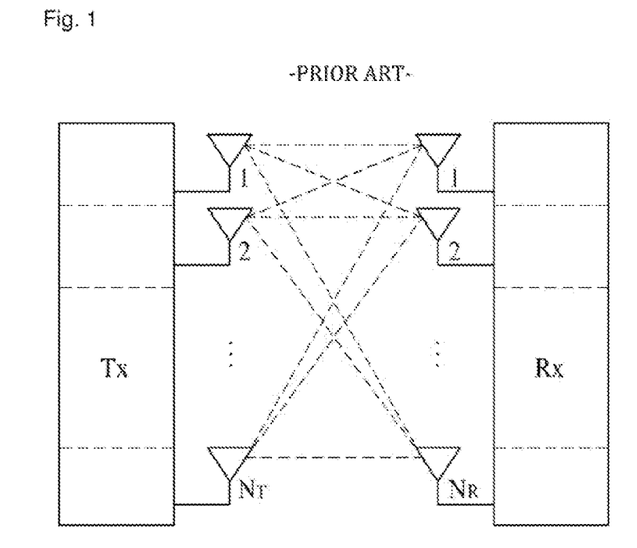
FIG. 1 is a diagram showing a MIMO communication system.

FIG. 1 is a diagram showing the configuration of a general MIMO system. As shown in FIG. 1, if the number of transmitters is increased to $N_T$ and, at the same time, the number of receivers is increased to $N_R$, a channel transmission capacity is theoretically increased in proportion to the number of antennas, unlike the case where a plurality of antennas is used in only a transmitter or a receiver. Accordingly, it is possible to improve a transmission rate and to remarkably improve frequency efficiency. As the channel transmission capacity is increased, the transmission rate may be theoretically increased by a product of a maximum transmission rate $R_0$ upon utilization of a single antenna and a rate increase ratio $R_i$ of Equation 1.

$$R_i = \min(N_T, N_R) \qquad \text{Equation 1}$$

For example, in a MIMO system using four transmit antennas and four reception antennas, it is possible to theoretically acquire a transmission rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 1, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2.

$$s = [s_1, s_2, \ldots, s_{N_T}]^T \qquad \text{Equation 2}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{Equation 3}$$

In addition, $\hat{s}$ may be expressed using a diagonal matrix P of the transmit powers as shown in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{Equation 4}$$

Considers that the $N_T$ actually transmitted signals $x_1, x_2, \ldots, x_{N_T}$ are configured by applying a weight matrix W to the information vector $\hat{s}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} \qquad \text{Equation 5}$$

-continued $$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

If the $N_R$ reception antennas are present, respective received signals $y_1, y_2, \ldots, y_{N_R}$ of the antennas are expressed by a vector as shown in Equation 6.

$$y = [y_1, y_2, \ldots, y_{N_R}]^T \qquad \text{Equation 6}$$

If channels are modeled in the MIMO communication system, the channels may be distinguished according to transmission/reception antenna indexes. A channel from the transmit antenna j to the reception antenna i is denoted by $h_{ij}$. In $h_{ij}$, it is noted that the index of the reception antenna precedes the index of the transmit antenna in view of the order of indexes.

Figure 2:
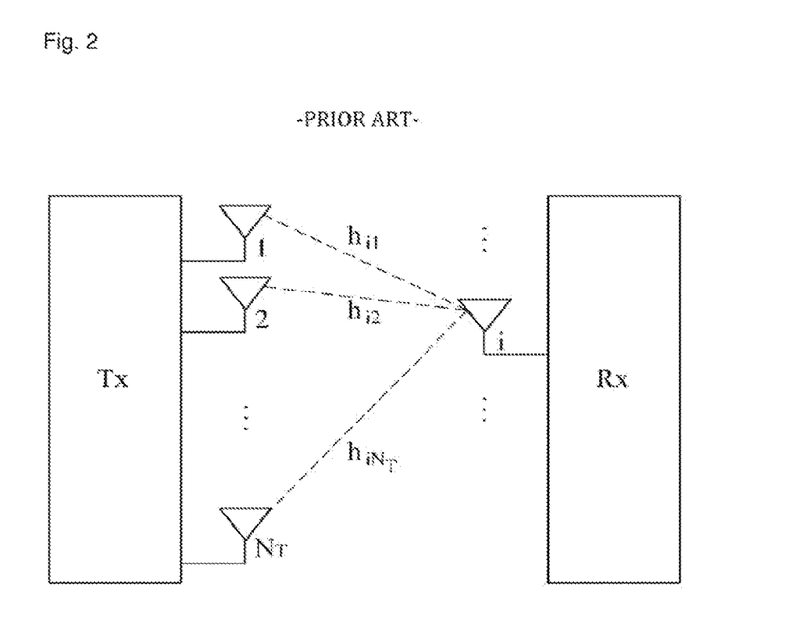
FIG. 2 is a diagram showing channels from a plurality of transmit antennas to a reception antenna.

Such channels may be also combined and expressed in the form of a vector and a matrix. A vector expression example is as follows. FIG. 2 shows channels from $N_T$ transmit antennas to a reception antenna i.

As shown in FIG. 2, the channels from the $N_T$ transmit antennas to the reception antenna i may be expressed as follows.

$$h_i^T = [h_{i1}, h_{i2}, \ldots, h_{iN_T}] \qquad \text{Equation 7}$$

Accordingly, through the matrix expression shown in Equation 7, all the channels from the $N_T$ transmit antennas to the $N_R$ reception antennas may be expressed by Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \qquad \text{Equation 8}$$

An Additive White Gaussian Noise (AWGN) is added to the actual channels after the above channel matrix H. The AWGN $n_1, n_2, \ldots, n_{N_R}$ added to the $N_R$ reception antennas may be expressed by a vector as shown in Equation 9.

$$n = [n_1, n_2, \ldots, n_{N_R}]^T \qquad \text{Equation 9}$$

The received signals obtained through the above-described equations may be shown in Equation 10.

$$y = \begin{bmatrix} y_1 \\ y_2 \\ \vdots \\ y_i \\ \vdots \\ y_{N_R} \end{bmatrix} \qquad \text{Equation 10}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmit antennas. That is, the channel matrix H is an $N_R \times N_T$ matrix. The rank of the matrix is defined by the smaller of the number of rows or columns, which is independent from each other. Accordingly, the rank of the matrix is not greater than the number of rows or columns. The rank of the channel matrix H is expressed by Equation 11.

$$\text{rank}(H) \leq \min(N_T, N_R) \qquad \text{Equation 11}$$

In the MIMO system, a precoding scheme provides beamforming gain and diversity gain to a transmitter and a receiver so as to provide high system throughput. However, the precoding scheme should be appropriately designed in consideration of antenna settings, channel environment, system structure, etc.

In general, the MIMO system for performing precoding in order to minimize complexity and control signaling overhead uses a codebook based precoding scheme. A codebook includes a predetermined number of precoding vectors/matrices predefined between a transmitter and a receiver according to a transmission rank and the number of antennas. The transmitter selects a specific precoding vector/matrix from a codebook according to channel state information received from the receiver, performs precoding with respect to a signal to be transmitted, and transmits the signal. In some cases, the transmitter may select a precoding matrix according to a predetermined rule, perform precoding, and transmit a signal, without receiving channel state information from the receiver.

Figure 3:
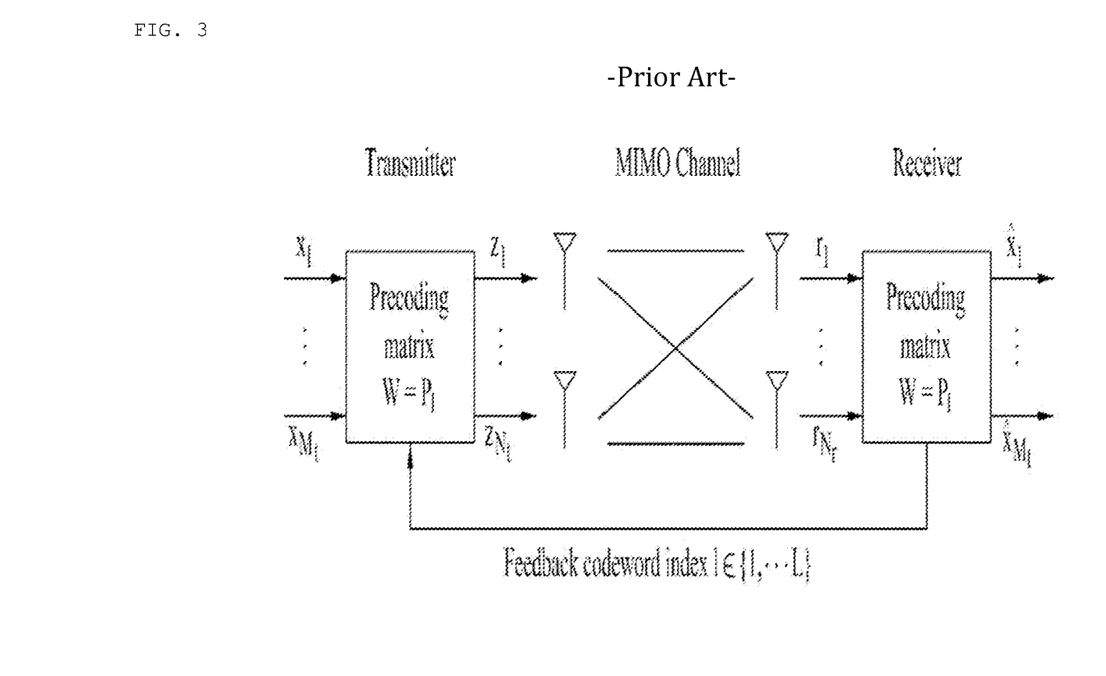
FIG. 3 is a diagram showing a codebook based precoding scheme.

FIG. 3 is a diagram illustrating the basic concept of a codebook based precoding scheme.

If a codebook based precoding scheme is used, as described above, a transmitter and receiver share codebook information including a predetermined number of precoding matrices predefined according to a transmission rank and the number of antennas. The receiver may measure a channel state through a received signal and feed preferred precoding matrix information back to the transmitter based on the codebook information. Although FIG. 3 shows the case where the receiver transmits the preferred precoding matrix information to the transmitter on a codeword-by-codeword basis, the present invention is not limited thereto.

The transmitter which receives the feedback information from the receiver may select a specific precoding matrix from the codebook based on the received information. The transmitter which selects the precoding matrix may perform precoding by multiplying layer signals corresponding in number to the number of transmission ranks by the precoding matrix and transmit the signal subjected to precoding via a plurality of antennas. The receiver which receives the signal precoded and transmitted by the transmitter may perform inverse processing of the precoding performed by the transmitter so as to restore the received signal. In general, since the precoding matrix satisfies the condition of a unitary matrix U such as $U*U^H=I$, inverse processing of the precoding may be performed by multiplying a Hermitian matrix $P^H$ of the precoding matrix P used for precoding of the transmitter by the received signal.

In a $3^{rd}$ generation partnership project long term evolution (3GPP LTE) release 8 system, if a MIMO scheme is applied to uplink signal transmission from a user equipment (UE) to a base station, due to deterioration in a peak-to-average ratio (PAPR)/cubic metric (CM) property, a MIMO transmission scheme is defined only with respect to downlink signal transmission from a base station to a UE. A method of applying a MIMO scheme to an uplink signal transmitted from a UE to a base station has been discussed in order to increase a transmission rate and acquire diversity gain. Even in the subsequent standard (3GPP LTE-Advanced or 3GPP LTE-A) of the 3GPP LTE system, a detailed method of applying a MIMO scheme to uplink signal transmission has been discussed.

A UE which supports multiple antenna transmission in an uplink system according to the 3GPP LTE-A standard may operate according to a single antenna transmission scheme or a spatial multiplexing transmission scheme. The single antenna transmission scheme is required when the UE operates in the existing 3GPP LTE system. In this case, the UE combines a plurality of transmit antennas using an appropriate precoding matrix such that the BS recognizes that the UE performs single antenna transmission. Meanwhile, in the spatial multiplexing transmission method using multiple antennas, as described above, it is important to design a precoding matrix to have a low PAPR/CM.

DISCLOSURE

Technical Problem

An output of some antennas of a UE including multiple antennas may be physically interrupted. That is, if some antennas of the UE are influenced by a part of a human body or a peripheral obstacle, the output of the antenna is considerably decreased below an actual transmit power. In this case, as described above, when single antenna transmission or spatial multiplexing transmission is performed by combining antennas, signal transmission performance may be decreased. Accordingly, there is a need for a method of efficiently performing multiple antenna transmissions in consideration of transmit power which may differ among antennas.

Technical Solution

The object of the present invention can be achieved by providing a method for performing multiple antenna transmission from a user equipment to a base station, including determining a criterion value of transmit power of each of a plurality of transmit antennas of the user equipment, grouping the plurality of transmit antennas into a first group of transmit antennas and a second group of transmit antennas according to the determined criterion value, and transmitting a signal to the base station via at least one of the first group of transmit antennas or the second group of transmit antennas.

The criterion value may be determined based on at least one of outputs of power amplifiers respectively mapped to the plurality of transmit antennas or signal qualities of the plurality of transmit antennas measured by the base station.

The transmitting may include transmitting the signal to the base station using only the first group of transmit antennas without using the second group of transmit antennas.

The transmitting may include performing rank-1 transmission to the base station by combining antennas belonging to the first group of transmit antennas.

The transmitting may include transmitting the signal to the base station using a precoding matrix configured to transmit a larger number of layer signals via the first group of transmit antennas as compared to the second group of transmit antennas.

In the precoding matrix, the number of elements having a value of 0 per column may be the same, elements having a value of 0 may not be present in the same row, and each column may include one element having a value of 0.

The precoding matrix may include a precoding matrix reconfigured by permuting each row of the precoding matrix according to the locations of the power amplifiers respectively mapped to the plurality of transmit antennas.

The precoding matrix includes, for rank-2 transmission, a matrix of Equation 1:

$$\begin{bmatrix} a & d \\ b & e \\ c & 0 \\ 0 & f \end{bmatrix}, \qquad \text{Equation 1}$$

and
includes, for rank-3 transmission, a matrix of Equation 2:

$$\begin{bmatrix} a & d & g \\ 0 & e & h \\ b & 0 & i \\ c & f & 0 \end{bmatrix} \qquad \text{Equation 2}$$

wherein, in Equations 1 and 2, a, b, c, d, e, f, g, h and i are non-zero complex number.

The method may further include selecting a combination of power amplifiers mapped to the one or more transmit antennas used for transmission of the signal to the base station, and reporting the combination of the power amplifiers to the base station.

In another aspect of the present invention, there is provided a user equipment which performs multiple antenna transmission to a base station, including: a plurality of antennas, a reception module configured to receive a signal from the base station via the plurality of antennas, a transmission module configured to transmit a signal to the base station via the plurality of antennas, and a processor configured to control the user equipment including the plurality of antennas, the reception module and the transmission module, wherein the processor determines a criterion value of transmit power of each of a plurality of transmit antennas of the user equipment, groups the plurality of transmit antennas into a first group of transmit antennas and a second group of transmit antennas according to the determined criterion value, and transmits a signal to the base station via at least one of the first group of transmit antennas or the second group of transmit antennas.

The processor may control transmission of the signal to the base station using only the first group of transmit antennas without using the second group of transmit antennas.

The user equipment may further include a memory configured to store a precoding matrix configured to transmit a larger number of layer signals via the first group of transmit antennas as compared to the second group of transmit antennas, and a precoder configured to perform precoding with respect to a signal to be transmitted to the base station and to output the precoded signal, using the precoding matrix stored in the memory, and the processor may control transmission of the precoded signal to the base station via the first group of transmit antennas and the second group of transmit antennas.

Advantageous Effects

According to the present invention, by adaptively transmitting a signal via an antenna having high transmit power among a plurality of antennas, it is possible to increase a signal transmission success probability. In addition, by transmitting a signal having a high PAPR via an antenna having high transmit power, it is possible to efficiently transmit a signal. In addition, it is possible to provide compatibility so as to enable a user equipment supporting multiple antenna transmission to operate even in the existing system supporting only single antenna transmission.

The effects of the present invention are not limited to the above-described effects and other effects which are not described herein will become apparent to those skilled in the art from the following description.

BEST MODE

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a user equipment (UE). In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (W-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A system. However, the technical spirit of the present invention is not limited thereto.

In the following description, the term "rank" denotes the number of paths for independently transmitting signals, and the term "number of layers" denotes the number of signal streams transmitted through each path. In general, since a transmitter transmits layers corresponding in number to the number of ranks used for signal transmission, the rank has the same meaning as the number of layers unless otherwise noted. In a precoding matrix, a row corresponds to each antenna and a column corresponds to a rank or layer signal.

Figure 4:
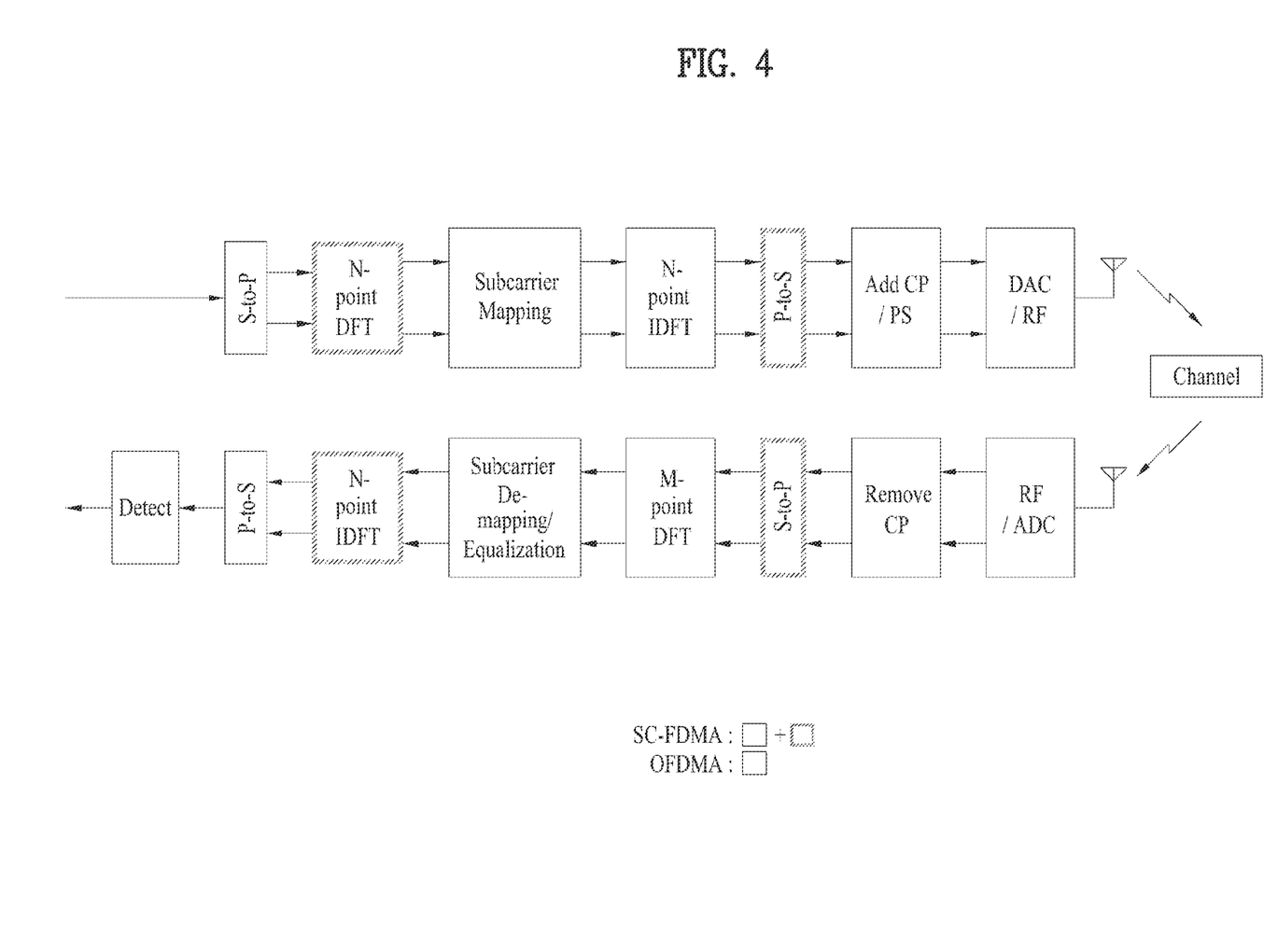
FIG. 4 is a block diagram of a transmitter and a receiver for illustrating a single carrier frequency division multiple access (SC-FDMA) scheme.

FIG. 4 is a diagram illustrating a general single carrier frequency division multiple access (SC-FDMA) scheme.

An OFDM scheme and an SC-FDMA scheme are equal in that, as shown in FIG. 4, serial signals are converted into parallel signals, the parallel signals are mapped to subcarriers, are subjected to IDFT or IFFT and converted into serial signals again, and the serial signals are transmitted thorough an RF module after CP attachment. However, the SC-FDMA scheme is characterized in that DFT spreading is performed after converting the parallel signals into the serial signals, thereby decreasing influence of IDFT or IFFF and maintaining a single signal property at a predetermined level or more.

In the case in which a MIMO scheme is applied to signal transmission using an SC-FDMA scheme, the configuration of a processor of a UE will now be described.

Figure 5:
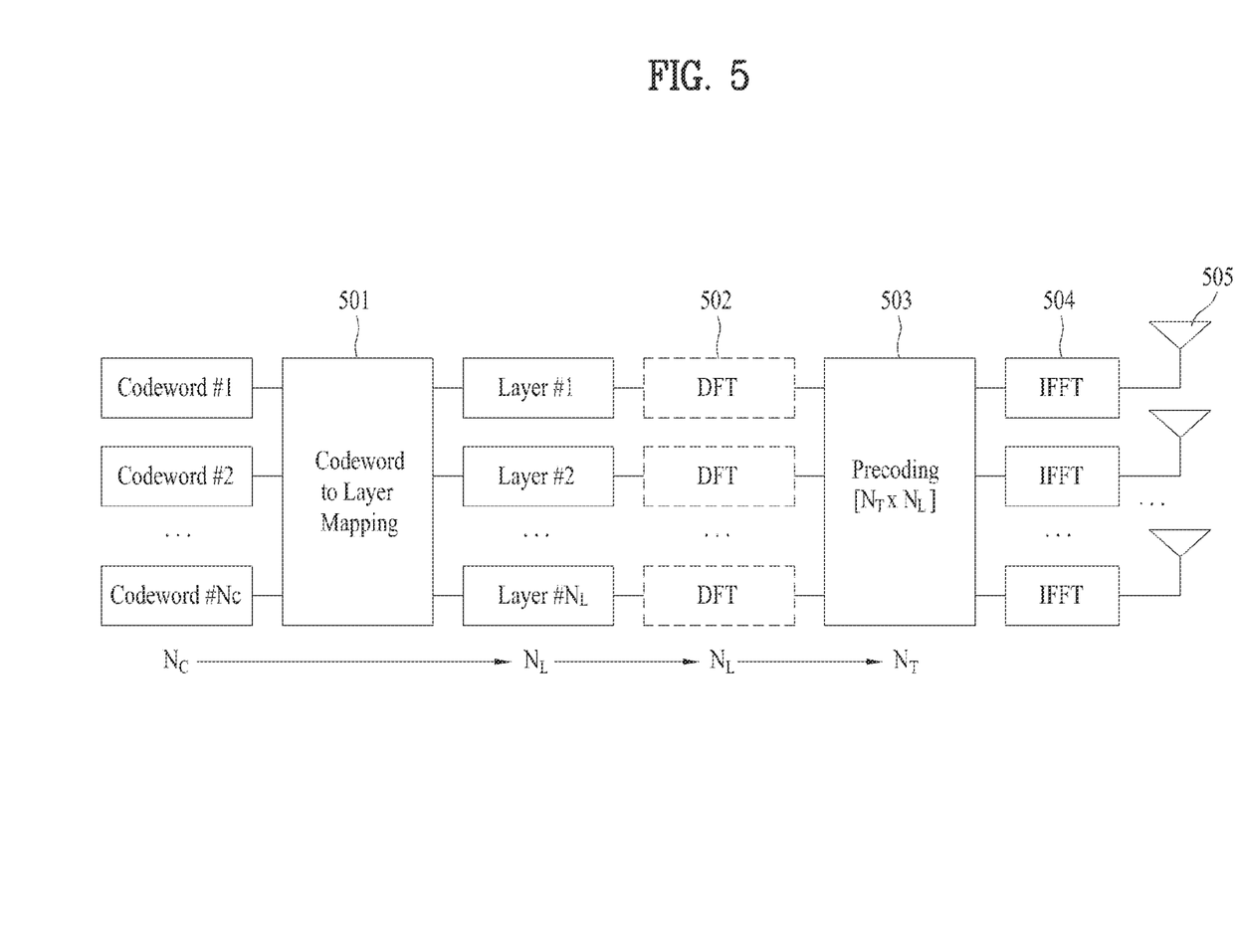
FIG. 5 is a diagram showing the configuration of a processor of a user equipment (UE).

FIG. 5 is a diagram showing the configuration of a processor of a user equipment according to an embodiment of the present invention in detail.

As shown in FIG. 5, the processor of the UE according to an embodiment of the present invention includes a layer mapper 501 for mapping uplink signals to layers corresponding in number to the number of specific ranks, a predetermined number of discrete Fourier transform (DFT) module 502 for performing DFT spreading with respect to the predetermined number of layer signals, and a precoder 503 for selecting a precoding matrix from a codebook stored in a memory and performing precoding with respect to a signal to be transmitted. As shown in FIG. 5, the DFT module 502 for transmitting the uplink signals using the SC-FDMA scheme are arranged at the previous stage of the precoder 503 and at the next stage of the layer mapper 501 such that the DFT spread signal is precoded on a layer-by-layer basis, is subjected to IFFT despreading, and is transmitted. Thus, it is possible to satisfactorily maintain the above-described PAPR/CM property by offsetting DFT spreading and IFFT despreading except for precoding.

Figure 6:
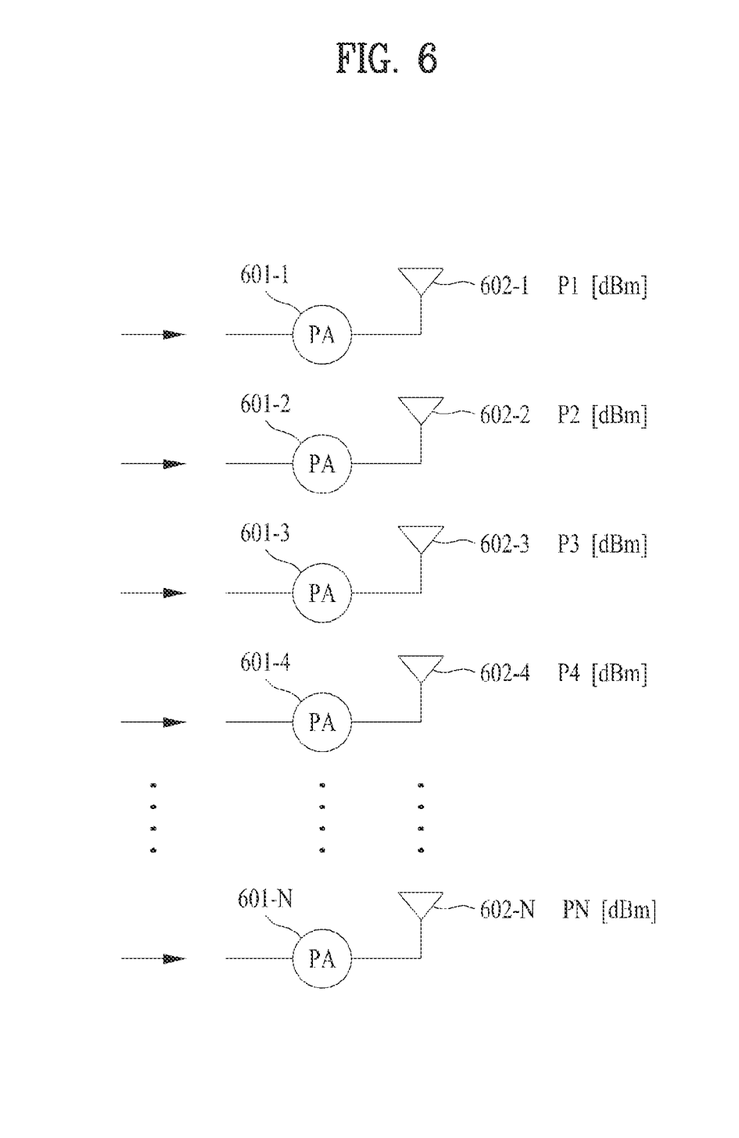
FIG. 6 is a diagram showing a mapping relation between an antenna and a power amplifier (PA).

FIG. 6 is a diagram showing a mapping relation between an antenna and a power amplifier (PA).

As shown in FIG. 6, a UE supporting multiple antenna transmission includes a plurality of transmit antennas 602-1, 602-2, 602-3, . . . , and 602-N and a plurality of PAs 601-1, 601-2, 601-3, . . . , and 601-N respectively mapped to the plurality of transmit antennas. Each PA is mapped to each antenna. For example, the PA 601-1 is mapped to the antenna 602-1, the PA 601-2 is mapped to the antenna 602-2, the PA 601-3 is mapped to the antenna 602-3, and the PA 601-N is mapped to the antenna 602-N. The mapping relation between the antennas and the PAs is not necessarily fixed. That is, the PA 601-1 mapped to the antenna 602-1 at a certain time may be mapped to the antenna 602-2 or another antenna at another time.

In the existing 3GPP LTE system supporting single antenna transmission, one PA is provided to one antenna and the output of the PA is defined as 23 dBm. Accordingly, in the case where a UE supporting multiple antenna transmission performs single antenna transmission, the sum of the PA outputs of the plurality of antennas of the UE needs to be set to 23 dBm. For example, the output of each of four PAs of a UE having four transmit antennas may be set to 17 dBm. However, the present invention is not limited thereto and the outputs of the plurality of PAs may be differently set.

Since the plurality of PAs may have various outputs, if the plurality of PAs is used in a UE supporting multiple antenna transmission, the used PAs may be variously combined. At this time, the UE may select any one of various PA combinations and the PA combination used by the UE may be reported to a base station.

In a plurality of transmit antennas, transmit powers P1, P2, P3, . . . , and PN may differ among the antennas. Since the outputs of the PAs respectively mapped to the antennas are different, the transmit powers of the antennas may be different. Alternatively, a signal transmitted via a specific antenna may be physically interrupted such that the transmit power of the antenna is decreased below the output of the PA. In this case, if a signal is transmitted without considering the transmit powers which differ among the antennas, a signal reception success probability may be decreased. Hereinafter, an efficient multiple antenna transmission method considering the transmit powers of the antennas will be described.

The uplink system of the existing 3GPP LTE only supports single antenna transmission. A UE transmits data, a control signal and a reference signal via one antenna. In a base station, a receiver supporting single antenna transmission of the UE is designed and a receiver is designed to support multiple users who perform single antenna transmission.

In the 3GPP LTE-A system, a UE may support multiple antennas. When a UE having multiple antennas enters an existing 3GPP LTE network, the UE should pretend to perform single antenna transmission. That is, since the 3GPP LTE system only supports single antenna transmission, even a UE having multiple antennas needs to perform single antenna transmission with respect to a base station. In the 3GPP LTE system, a PA of a single antenna of a UE is defined to 23 dBm. Accordingly, in order to enable a UE having multiple antennas to perform single antenna transmission, a method of setting a specific PA of a plurality of PAs to 23 dBm and performing single antenna transmission using an antenna to which the specific PA is mapped may be considered.

However, since a PA having a high output may increase UE cost, it is inefficient that a PA having an output of 23 dBm is necessarily included in order to operate the UE in the existing 3GPP LTE system. That is, when a UE having a PA having an output of 23 dBm operates in the 3GPP LTE-A system, resource waste may occur if all PAs are not used.

Accordingly, it is efficient that a UE includes PAs having outputs lower than 23 dBm. In order to enable a UE having PAs having low outputs to achieve the same effect as single antenna transmission, the UE may use an appropriate precoding matrix or a small delay cyclic delay diversity (CDD) scheme to enable a base station of the 3GPP LTE system to recognize that single antenna transmission is performed.

In spatial multiplexing transmission using multiple antennas, a PAPR/CM property needs to be considered. The PAPR is a parameter representing a property of a waveform and is obtained by dividing a peak amplitude of a waveform by a root mean square (RMS) value of the waveform. The PAPR is associated with a dynamic range which should be supported by a PA of a transmitter. In general, the PAPR of a single carrier signal is better than the PAPR of a multi-carrier signal. The CM value is another measurement value representing the numerical value indicated by the PAPR. Accordingly, if a PA having a large dynamic range is used, a high PAPR/CM may also be supported. However, since the PA having the large dynamic range is expensive, a UE generally includes a PA having a low output. Due to limited PA output, the power of the UE is limited. Accordingly, in spatial multiplexing transmission using multiple antennas, it is important to design a precoding matrix to have a low PAPR/CM.

For example, it is assumed that rank-2 transmission is selected in multiple antenna transmission (4Tx antenna transmission) using four transmit antenna. In the rank-2 transmission, in order to obtain a low PAPR/CM in a state in which power is limited, layer signals should not be combined. At this time, the precoding matrix may be designed to include a value of 0. It is possible to perform spatial multiplexing transmission with a low PAPR/CM while utilizing multiple antennas using a codebook composed of such a precoding matrix.

Meanwhile, if PAs having outputs which differ among antennas are used in multiple antenna, transmission, a certain antenna may have limited power but another antenna may have a margin of power according to the property of the PA. For example, it may be assumed that a UE having four transmit antennas includes PAs having outputs of 20 dBm, 20 dBm, 17 dBm and 17 dBm. For single antenna transmission, in order to set the sum of the outputs of the antennas in 4Tx antenna transmission to 23 dBm, the outputs of the PAs of the four antennas are equally set to 17 dBm. In consideration of such a PA configuration, power-limited transmission is performed in the antennas having the output of 17 dBm and signal transmission with a margin of transmit power is performed in the antennas having the output of 20 dBm.

In such single antenna transmission, the case where the output of the transmit antenna is physically interrupted needs to be considered. For example, the case where a user grasps a UE having the same size as a mobile phone to cover a specific antenna of the UE or the case where an obstacle is located in the vicinity of a specific antenna of a UE having the same size as a laptop may be considered. In this case, even when the UE performs transmission with a maximum output, transmission power may be lower than reception power. In this state, if a UE having multiple antennas performs rank-1 transmission using all antennas, performance lower than that of single antenna transmission of 23 dBm is obtained.

In spatial multiplexing transmission, if a precoding matrix designed to have a low PAPR/CM is used in a state in which a PA of a specific antenna has a larger output, performance may be deteriorated. That is, if a certain layer is mapped to a specific antenna without being combined with another layer and the output of the PA of the specific antenna is deteriorated, a signal may be lost in the layer.

Hereinafter, embodiments of the present invention for efficient multiple antenna transmission will be described.

Embodiment 1

Embodiment 1 relates to a method of setting an output of a PA corresponding to each antenna in the case where rank-1 transmission is performed using all four transmit antennas.

It is assumed that four PAs 601-1, 601-2, 601-3 and 601-4 respectively corresponding to four transmit antennas 602-1, 602-2, 602-3 and 602-4 are present, the output of the PA 601-1 is 23 dBm, the output of the PA 601-2 is 20 dBm, and the outputs of the PA 601-3 and 601-4 are 17 dBm. If it is assumed that the outputs of the transmit antennas are not decreased by physical interruption, the output of the PA corresponds to the transmit power of the transmit antenna.

Since a state in which signals are stably transmitted via all antennas is guaranteed, the PA 601-1 and 601-2 may be set to a transmit power lower than a maximum output, but may not exceed 17 dBm which is the maximum outputs of the PAs 601-3 and 601-4. Accordingly, in order to perform rank-1 transmission with transmit power of 23 dBm by combining four transmit antennas, all the transmit powers of the four transmit antennas may be set to 17 dBm. According to Embodiment 1, the UE may perform rank-1 transmission with transmit power of 23 dBm using a precoding matrix obtained by combining all four transmit antennas.

Embodiment 2

Embodiment 2 relates to a method of selecting only a transmit antenna having a relatively high output from among a plurality of transmit antennas and performing uplink transmission.

For 4Tx antenna transmission, it is assumed that two PAs 601-1 and 601-2 having an output of 20 dBm and two PAs 601-3 and 601-4 having an output of 17 dBm are used. In the present embodiment, two PAs 601-1 and 601-2 having a high output (20 dBm) are selected from among the four PAs and the PAs 601-3 and 601-4 having a low output (17 dBm) are not selected. Therefore, the UE may perform rank-1 transmission using only two transmit antennas 602-1 and 602-2 respectively corresponding to the two PAs 601-1 and 601-2 having the output of 20 dBm. For example, rank-1 transmission may be performed with transmit power of 23 dBm using a precoding matrix obtained by combining two transmit antennas 602-1 and 602-2. Accordingly, by performing rank-1 transmission using only some antennas having high transmit power, it is possible to increase a signal transmission success probability.

Meanwhile, if a specific antenna is physically interrupted by a users hand, the strength of a signal received from a base station may be remarkably lower than the transmit power of the antenna according to the output of the PA.

In the 3GPP LTE-A system, the base station may instruct the UE to perform transmission using some antennas. That is, since the UE cannot determine via which antenna the signal is transmitted with transmit power higher than that of the other antennas, the base station measures the transmit power of the signal transmitted via each antenna and informs the UE of an antenna with high transmit power. For example, the UE may transmit a sounding reference signal (SRS) to the base station according to a plurality of transmit antennas and the base station may determine which of the plurality of transmit antennas of the UE has good channel quality (e.g., received signal strength) according to a predetermined criterion value from the SRS. The transmit antennas of the UE with good channel quality may be grouped into one group and the remaining transmit antennas of the UE may be grouped into another group. The base station may inform the UE of the antennas (antenna group) used for rank-1 transmission through radio resource control (RRC) signaling or Layer 1/Layer 2 (L1/L2) signaling. The UE may perform rank-1 transmission using a combination of antennas (antenna group) with high transmit power without using antennas (antenna group) with low transmit power according to the instruction of the base station.

For example, in 4Tx antenna transmission, if it is assumed that the first and second antennas 602-1 and 602-2 of the UE are physically blocked by a user's hand, the quality of uplink signals transmitted via the first and second antennas 602-1 and 602-2 (reception power strength of the base station) is considerably decreased. Accordingly, the base station may instruct the UE to perform multiple antenna transmission using the third and fourth antennas 602-3 and 602-4 with good transmit power.

One of the plurality of PAs 601-1, 601-2, ..., and 601-N may be mapped to each of the plurality of antennas 602-1, 602-2, ..., and 602-N and the mapping relation between the antennas and the PAs is not always fixed. For example, in 4Tx antenna transmission, it is assumed that the outputs of the first and second PAs 601-1 and 601-2 of the four PAs are higher than those of the third and fourth PAs 601-3 and 601-4. Transmit power of each antenna may be changed with time according to the location of a physical obstacle (e.g., a user's hand) located in the vicinity of an antenna. That is, if the user grasps a UE and thus covers the first and second transmit antennas 602-1 and 602-2 of the UE, the transmit powers of the third and fourth antennas 602-2 and 602-4 are better that those of the first and second transmit antennas 602-1 and 602-2. Accordingly, the first and second PAs 601-1 and 601-2 having a high output may be mapped to the antennas (e.g., 602-3 and 602-4) which are not interrupted by a physical obstacle.

Embodiment 3

Embodiment 3 of the present invention in which a precoding matrix is configured in a UE supporting multiple antenna transmission will be described with reference to FIG. 7.

A plurality (N) of layers may be combined by a precoding matrix and transmitted via multiple antennas. In order to maintain a low PAPR, a precoding matrix may be designed such that layers are transmitted via one antenna without being combined.

In the following description, a row of a precoding matrix corresponds to each physical antenna and a column thereof corresponds to a rank or each layer signal. In precoding matrices W1 and W2 of FIG. 7, a, b, c, d, e, f, g and h denote certain non-zero complex numbers.

Figure 7:
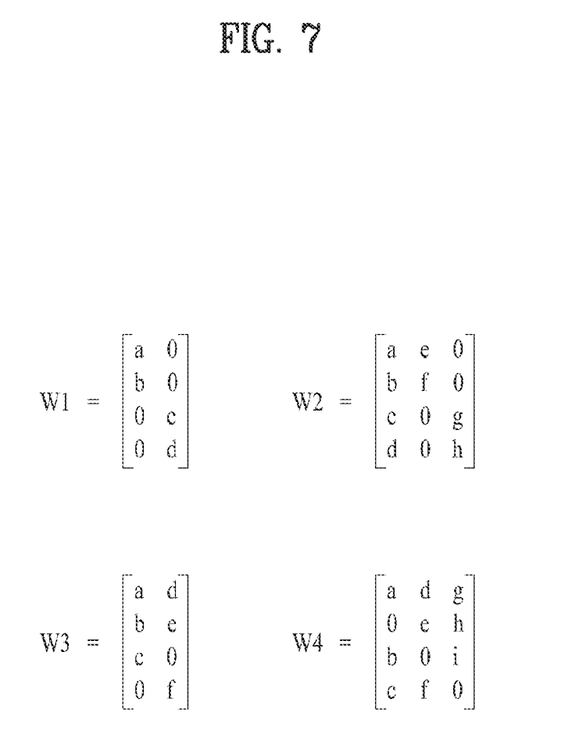
FIG. 7 is a diagram showing a precoding matrix according to an embodiment of the present invention.

The precoding matrix W1 of FIG. 7 is for rank-2 transmission using four physical antennas. An element corresponding to a first row and a first column of the precoding matrix W1 has a non-zero value a and an element corresponding to a first row and a second column (layer) has a value of 0. That is, the precoding matrix may be designed such that only the signal of the first column (layer) is transmitted via the first row (antenna). In addition, only a signal of a first layer is transmitted via a second antenna, only a signal of a second layer is transmitted via a third antenna, and only a signal of a second layer is transmitted via a fourth antenna. Accordingly, by transmitting only one layer signal via one physical antenna, it is possible to maintain a low PAPR of a transmitted signal.

As described above with reference to FIG. 5, if one layer signal is set to be transmitted via one antenna during precoding after DFT spreading, the effect of IFFT despreading may be immediately offset by DFT spreading.

The precoding matrix W2 of FIG. 7 is for rank-3 transmission using four physical antennas. First and second layer signals are combined and transmitted via first and second antennas and first and third layer signals are combined and transmitted via third and fourth antennas. In the precoding matrix W2, since only two layer signals are combined and transmitted via one antenna, it is possible to maintain a low PAPR as compared to the case where three layer signals are combined and transmitted via one antenna.

In the precoding matrix W2 of FIG. 7, a first layer signal is transmitted via the first to fourth antennas, a second layer is transmitted via the first and second antennas, and a third layer signal is transmitted via the third and fourth antennas. Therefore, the first layer signal may have higher spatial diversity than the second and third layer signals.

In the precoding matrices W1 and W2 of FIG. 7, since each row is configured to have the same PAPR, the PA having the same output may be designed to be mapped to each antenna.

Embodiment 4

Embodiment 4 of the present invention in which a precoding matrix is configured to have PAPRs which differ among transmit antennas in a UE supporting multiple antenna transmission will be described with reference to FIG. 7.

In order to obtain transmit antennas having different PAPRs, a small number of layer signals is transmitted in a certain row of a precoding matrix and a large number of layer signals is combined and transmitted in another row. When such a precoding matrix is configured, the following may be considered.

The number of elements having a value of 0 per column is the same.

Elements having a value of 0 are not present in the same row.

Each column includes one element having a value of 0.

A non-zero element of the precoding matrix is expressed by a certain non-zero complex number.

A precoding matrix W3 designed in consideration of the above-described matters is for rank-2 transmission using four physical antennas. Since first and second columns have non-zero values in first and second rows of the precoding matrix and only one of the first or second columns has a non-zero value in third and fourth rows, the first and second rows (antennas) have PAPRs relatively higher than those of the third and fourth rows (antennas).

PAs having high outputs may be mapped to the first and second antennas having high PAPRs. Four transmit antennas may be grouped into an antenna group (e.g., first and second transmit antennas) with high transmit power and an antenna group (e.g., third and fourth transmit antennas) with low transmit power. The grouping of the antennas may be determined based on the outputs of the PAs respectively mapped to the antennas. In the LTE-A system, the base station may determine which of the four transmit antennas of the UE has high reception power (antenna belonging to an antenna group with high transmit power) and inform the UE of the antenna through control signaling. Accordingly, in the present embodiment, in a precoding matrix, a row having a high PAPR may be mapped to an antenna group with high transmit power and a row having a low PAPR may be mapped to an antenna group with low transmit power.

A precoding matrix reconfigured by permutating a row of a precoding matrix according to four PA locations may be used. That is, if the outputs of the first and third PAs are high, a second row of the precoding matrix W3 of FIG. 7 is permutated to a third row such that an antenna having a high PAPR is mapped to a PA having a high output.

The precoding matrix W4 of FIG. 7 is for rank-3 transmission using four physical antennas. In the precoding matrix W4, all first to third columns of a first row have non-zero values and only two columns of three columns of second to third rows have non-zero values. That is, first to third layer signals are combined and transmitted via the first antenna, second and third layer signals are combined and transmitted via the second antenna, first and third layer signals are combined and transmitted via the third antenna, and the first and second layer signals are combined and transmitted via the fourth antenna.

The first row (antenna) of the precoding matrix W4 has a relatively higher PAPR than the remaining rows (antennas) thereof and a PA having a high output may be designed to be mapped to the first row (antenna). Using a precoding matrix reconfigured by permuting a row of the precoding matrix W4, a row having a high PAPR may be mapped to the location of a PA having a high output.

In the precoding matrices W3 and W4 of FIG. 7, a, b, c, d, e, f, g, h and i are expressed by certain non-zero complex numbers. That is, the elements of the precoding matrices W3 and W4 may be expressed by Quadrature Phase-Shift Keying (QPSK) or 8 Phase-Shift Keying (8PSK).

The precoding matrices W3 and W4 of FIG. 7 may be configured to satisfy the condition of a unitary matrix U.

Figure 8:
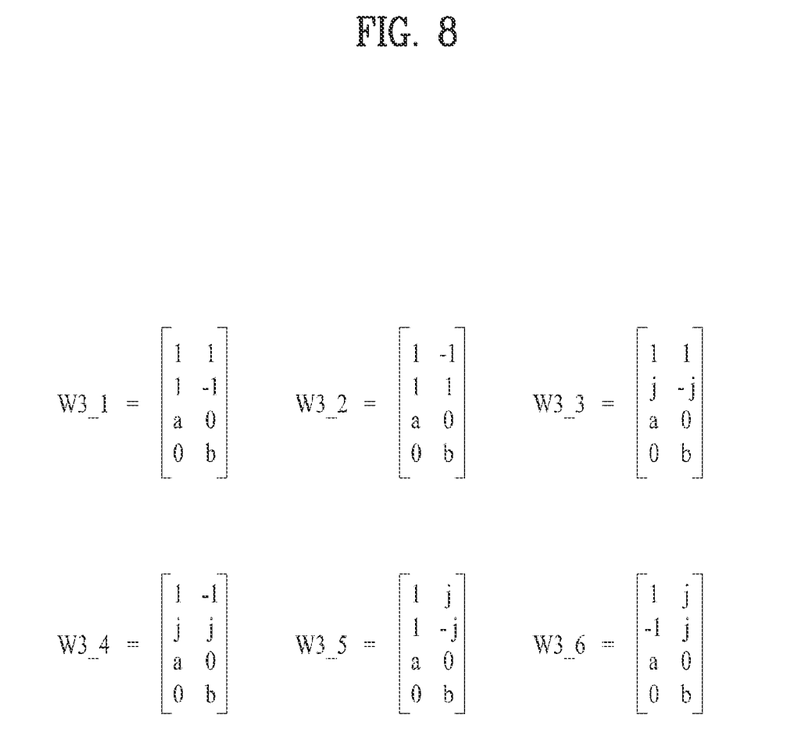
FIG. 8 is a diagram showing a detailed example of a precoding matrix according to an embodiment of the present invention.

Precoding matrices W3_1 and W3_6 shown in FIG. 8 are exemplary matrices of the precoding matrix W3 of FIG. 7 and are embodiments of the unitary matrices composed of QPSK. In the precoding matrices of FIG. 8, $a$ and $b$ may be certain values expressed by QPSK. In the present invention, a precoding matrix reconfigured by permuting the row and/or column of each of the precoding matrices shown in FIG. 8 may be used.

The embodiments of the precoding matrix for rank-2 and rank-3 transmission using four antennas may be combined and used in a manner of including a predetermined number of precoding matrices in one codebook on a per rank basis.

Figure 9:
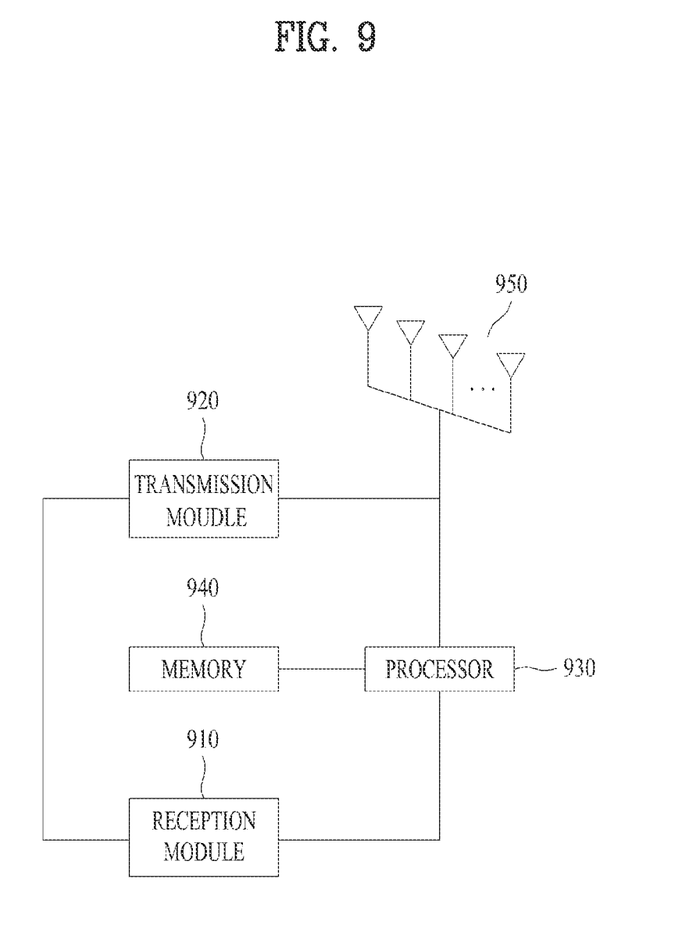
FIG. 9 is a diagram showing the configuration of a UE apparatus according to an embodiment of the present invention.

FIG. 9 is a diagram showing the configuration of a UE apparatus according to an embodiment of the present invention.

Referring to FIG. 9, the UE apparatus may include a reception module 910, a transmission module 920, a processor 930, a memory 940 and a plurality of antennas 950. The reception module 910 may receive a variety of signals, data and, information from a base station via the plurality of antennas 950. The transmission module 920 may transmit a variety of signals, data and information to a base station via the plurality of antennas 950. The processor 930 controls the UE including the plurality of antennas 950, the reception module 910 and the transmission module 920.

The processor 930 of the UE apparatus may determine a criterion value of transmit power of each of the plurality of transmit antennas 950 of the UE, group the plurality of transmit antennas 950 into a first group of transmit antennas and a second group of transmit antennas according to the determined criterion value, and transmit a signal to a base station via at least one of the first group of transmit antennas or the second group of transmit antennas.

The processor 930 may control transmission of the signal to, the base station using only the first group of transmit antennas having high transmit power without using the second group of transmit antennas having low transmit power.

The memory 940 stores a precoding matrix configured to transmit a larger number of layer signals via the first group of transmit antennas having high transmit power as compared to the second group of transmit antennas having low transmit power. The processor 930 may perform precoding with respect to the signal to be transmitted to the base station and control transmission of the precoded signal to the base station via the first group of transmit antennas and the second group of transmit antennas, using the precoding matrix stored in the memory 940.

The processor 930 performs a function for computing information received by the UE apparatus or information to be transmitted to an external device. The memory 940 may store the computed information for a predetermined time and may be replaced with a component such as a buffer (not shown).

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

The above-described embodiments of the present invention are applicable to various mobile communication systems.

The invention claimed is:

1. A method for performing multiple antenna transmission from a user equipment to a base station, comprising:
   determining, by the user equipment for an uplink transmission, a criterion value of transmit power of each transmit antenna of a plurality of transmit antennas of the user equipment;
   grouping, by the user equipment, the plurality of transmit antennas into a first group of transmit antennas and a second group of transmit antennas according to the determined criterion value, wherein the first group of transmit antennas has higher transmit power than the second group of transmit antennas; and transmitting, by the user equipment, a signal to the base station via the first group of transmit antennas and the second group of transmit antennas, wherein the transmitting includes transmitting the signal to the base station using a precoding matrix configured to transmit a larger number of layer signals via the first group of transmit antennas as compared to the second group of transmit antennas, at least one layer signal being transmitted via each of the first group and the second group of transmit antennas, and wherein, in the precoding matrix, the number of elements having a value of 0 per column is the same, elements having a value of 0 are not present in the same row, and each column includes only one element having a value of 0.

2. The method according to claim 1, wherein the criterion value is determined based on outputs of power amplifiers respectively mapped to the plurality of transmit antennas.

3. The method according to claim 1, wherein the precoding matrix includes a precoding matrix reconfigured by permuting each row of the precoding matrix according to the locations of power amplifiers respectively mapped to the plurality of transmit antennas.

4. The method according to claim 1, wherein the precoding matrix includes, for rank-2 transmission, a matrix of Equation 1:

$$\begin{bmatrix} a & d \\ b & e \\ c & 0 \\ 0 & f \end{bmatrix}, \quad \text{Equation 1}$$

and
includes, for rank-3 transmission, a matrix of Equation 2:

$$\begin{bmatrix} a & d & g \\ 0 & e & h \\ b & 0 & i \\ c & f & 0 \end{bmatrix} \quad \text{Equation 2}$$

wherein, in Equations 1 and 2, a, b, c, d, e, f, g, h and i are non-zero complex numbers.

5. The method according to claim 1, further comprising:
selecting a combination of power amplifiers mapped to one or more transmit antennas of the at least one group of the first group of transmit antennas or the second group of transmit antennas used for transmission of the signal to the base station; and reporting the combination of the power amplifiers to the base station.

6. A user equipment which performs multiple antenna transmission to a base station, comprising:
a plurality of antennas;
a reception module configured to receive a signal from the base station via the plurality of antennas;
a transmission module configured to transmit a signal to the base station via the plurality of antennas; and
a processor configured to control the user equipment including the plurality of antennas, the reception module, and the transmission module;

wherein the processor is further configured to:
determine, for an uplink transmission, a criterion value of transmit power of each transmit antenna of a plurality of transmit antennas of the user equipment,
group the plurality of transmit antennas into a first group of transmit antennas and a second group of transmit antennas according to the determined criterion value, wherein the first group of transmit antennas has higher transmit power than the second group of transmit antennas, and
transmit a signal to the base station via the first group of transmit antennas and the second group of transmit antennas, wherein the user equipment further comprises:
a memory configured to store a precoding matrix configured to transmit a larger number of layer signals via the first group of transmit antennas as compared to the second group of transmit antennas, at least one layer signal being transmitted via each of the first group and the second group of transmit antennas; and
a precoder configured to perform precoding with respect to a signal to be transmitted to the base station and to output the precoded signal, using the precoding matrix stored in the memory,
wherein the processor is further configured to control transmission of the precoded signal to the base station via the first group of transmit antennas and the second group of transmit antennas, and
wherein, in the precoding matrix, the number of elements having a value of 0 per column is the same, elements having a value of 0 are not present in the same row, and each column includes only one element having a value of 0.

* * * * *